United States Patent [19]

van Gelderen

[11] Patent Number: 5,106,224
[45] Date of Patent: Apr. 21, 1992

[54] DEVICE FOR RAPID COUPLING OF A DRIVESHAFT AND A DRIVEN SHAFT AND ITS APPLICATION, IN PARTICULAR, TO A MOTOR VEHICLE STEERING SYSTEM

[75] Inventor: Arjen van Gelderen, Vendome, France

[73] Assignee: Nacam, Vendome, France

[21] Appl. No.: 499,055

[22] Filed: Mar. 26, 1990

[30] Foreign Application Priority Data

Apr. 7, 1989 [FR] France .................. 89 04622

[51] Int. Cl.$^5$ ................................. F16B 7/00
[52] U.S. Cl. ......................... 403/315; 403/325; 403/341; 403/383
[58] Field of Search ............. 403/321, 322, 325, 363, 403/327, 359, 315, 341

[56] References Cited

U.S. PATENT DOCUMENTS

| | | |
|---|---|---|
| 2,017,123 | 10/1935 | Harbert . |
| 2,305,234 | 12/1942 | Bratz ................. 403/315 X |
| 3,220,757 | 11/1965 | Potter . |
| 3,240,519 | 3/1966 | Weasler ................. 403/325 |
| 3,260,541 | 7/1966 | Sadler et al. ............ 403/325 |
| 3,998,560 | 12/1976 | Damour . |
| 4,579,476 | 4/1986 | Post .................... 403/322 |
| 4,645,372 | 2/1987 | Suzuki .................. 403/325 |
| 4,859,110 | 8/1989 | Dommel ................. 403/325 |
| 4,900,182 | 2/1990 | Stillwagon .............. 403/325 |
| 4,927,286 | 5/1990 | Hobluigie et al. ........ 403/322 |

FOREIGN PATENT DOCUMENTS

| | | |
|---|---|---|
| 0292442 | 11/1988 | European Pat. Off. . |
| 3228889 | 2/1984 | Fed. Rep. of Germany . |
| 1496227 | 8/1966 | France . |
| 2067783 | 8/1971 | France . |

Primary Examiner—Peter M. Cuomo
Attorney, Agent, or Firm—Robert E. Burns; Emmanuel J. Lobato

[57] ABSTRACT

The device for coupling a shaft provided with a rod (10) having a noncircular end (11) and a shaft provided with a yoke (20) having a U-shaped fork (21) capable of pivoting in a direction (25) perpendicular to their common axis (X—X) comprises a guide surface (321) on the yoke, a sleeve (330) at least partially enclosing the yoke and movable relative to the latter so as to unmask or mask the U of the fork, a resilient coil spring (340) normally biasing the sleeve to mask the fork, and a locking bolt (350) retaining the sleeve against the resilient bias.

Application to motor vehicle steering systems when the rod is fastened to a pinion and the yoke is fastened to a universal joint jaw.

10 Claims, 3 Drawing Sheets

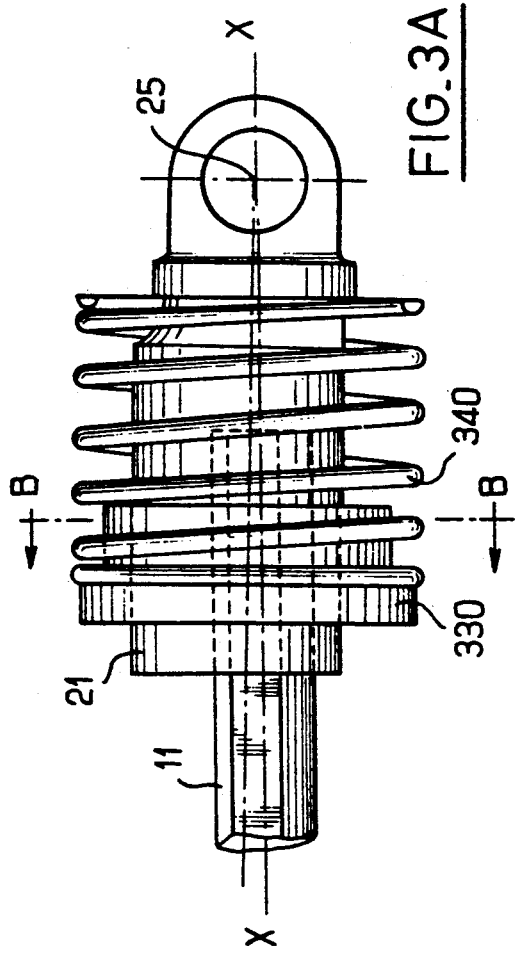
FIG._3A
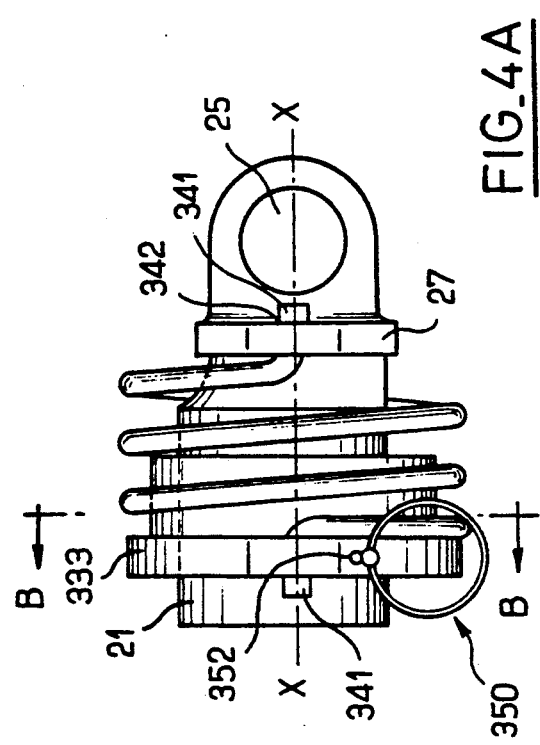
FIG._4A
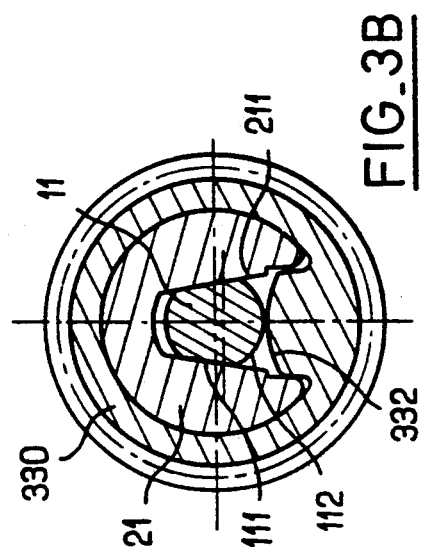
FIG._3B
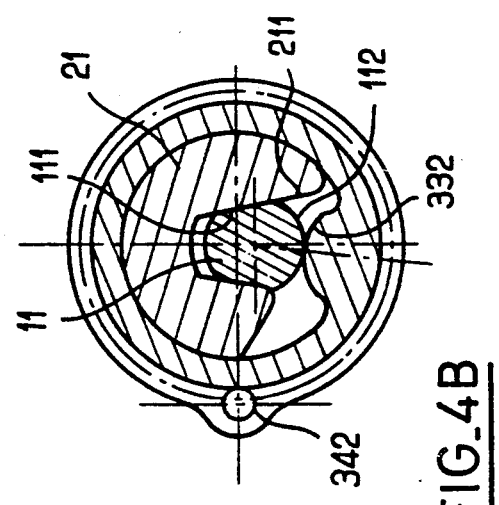
FIG._4B

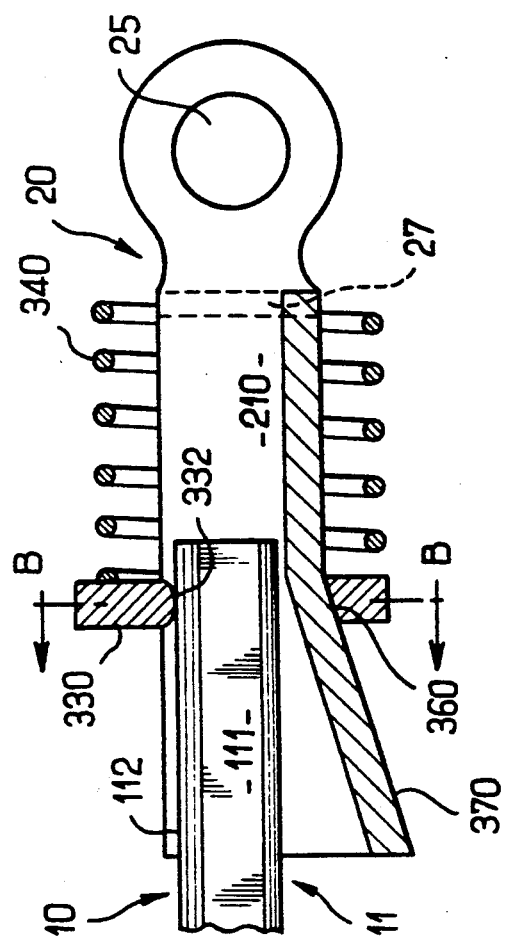
FIG._5A
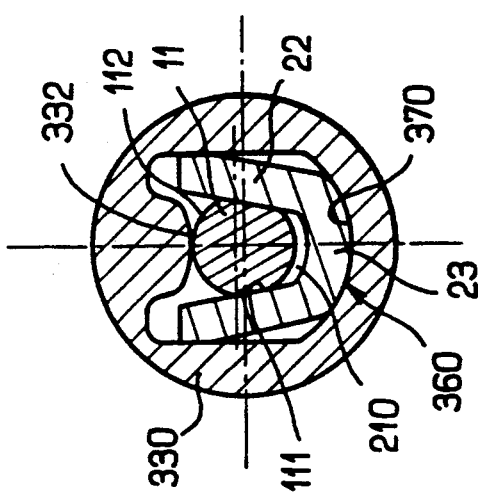
FIG._5B

DEVICE FOR RAPID COUPLING OF A DRIVESHAFT AND A DRIVEN SHAFT AND ITS APPLICATION, IN PARTICULAR, TO A MOTOR VEHICLE STEERING SYSTEM

BACKGROUND OF THE INVENTION

The invention relates to couplings enabling a drive shaft to be connected to a driven shaft, such as in particular a rod having an end of noncircular section and a fork of U-shaped section, and has more particularly as its subject a coupling device of this kind which can be placed in position quickly and is also reliable both during this operation and during its functioning.

In numerous technical fields it is necessary to couple two shafts, for example a rod to a member such as a fork, said rod and said fork each being associated with one of the shafts, in such a manner as to connect the latter together for co-rotation.

This type of situation is for example encountered in the automobile industry when it is required to connect the rod of a steering gearbox pinion to the jaw of a universal joint fastened to one of the shafts of a steering column.

One technique in use at the present time consists in arranging for the fork associated with the shaft, which is to be fastened to the pinion end of noncircular section, to be connected to one of the jaws of the universal joint in such a manner as to be pivotable about one of the cross pins of the universal joint, and for said fork to engage over the end of noncircular section of the pinion when it is turned down onto said end by pivoting. The end of noncircular section, which is then held captive in the fork without being able to turn, is immobilized with the aid of locking means.

These locking means usually consist of a threaded rod which is provided with cams on its periphery and which is passed through the fork and then clamped on the latter with the aid of a nut. The rod is turned so that the cams on its periphery drive the end of noncircular section towards the bottom of the fork, whereupon the end is clamped by screwing the nut onto the threaded rod portion which projects out of the fork. If use is made of a nut equipped with a braking device, after several turns of the nut the rod will come into contact with the braking or locking device and the torque is increased; when the nut is turned further, it drives the rod rotationally in its movement and one of the cams of the rod comes into contact with the end, which it then drives towards the bottom of the fork; additional screwing then effects the locking.

Although a technique of this kind is in general satisfactory, it is far from being free of disadvantages during assembly.

Moreover, if the locking means should slacken and become free from the fork during operation, the fork may become detached and the two shafts originally coupled together will no longer be connected to one another. It will readily be understood that this insidious situation is particularly troublesome in the case of a motor vehicle steering system.

Assembly work of this kind is generally done in the engine compartment of a vehicle, where space is particularly scarce. In order to place the rod and the nut in position the operator must use both his hands at the same time. This is particularly difficult if it is recalled that, in addition to the restricted free space available to the operator, access to that space is very often inconvenient; this considerably hampers the placing in position and the utilization of automatic screwing equipment of the compressed air or electric motor type.

The invention seeks to obviate the shortcomings of the known technique, particularly those briefly mentioned above, by ensuring that the device proposed can be rapidly and reliably assembled and can be placed in position easily.

SUMMARY OF THE INVENTION

The subject of the invention is a device for the coupling of a drive shaft and a driven shaft which are capable of turning on a common axis, particularly for connecting together a rod having an end of noncircular section and a fork of U-shaped section which is adjustable in a direction at right angles to said axis and to the branches of the U which face one another, and provided with a locking device for holding captive and clamping said end in the passage bounded by said branches.

The device according to the invention for coupling a rod having a noncircular end and a yoke having a U-shaped fork, which are associated with a drive shaft in the one case and with a driven shaft in the other case, and which are capable of turning on a common axis, and in which, on the one hand, said end has two convergent walls inclined relative to each other in a V whose apex is in a plane passing through said axis and also has a support face situated opposite the apex of the V, and in which, on the other hand, said fork has two branches which face one another and are connected by a bridge and which together bound a longitudinal axial passage open at least one of its ends and leading out on its periphery, parallel to said common axis, through an aperture, and also two convergent walls facing one another and inclined relative to one another in a V whose apex is situated opposite said aperture and is adjustable by pivoting in a direction perpendicular to said common axis and, approximately, to said branches, and in which said walls are intended to come into contact when said yoke is pivoted about said direction from a position in which said passage is inclined relative to said common axis and at a distance from said end, in order to cause said passage to straddle the latter by causing it to penetrate laterally through said aperture. This device is remarkable in that it has a guide surface on the periphery of the yoke, a sleeve locally enclosing the yoke and provided with a bearing surface cooperating with said guide surface in such a manner as to be able to be displaced relatively between a first assembly position, in which said aperture is free, and a second coupling position in which said aperture is at least partly masked, and also provided with a protuberance engaged in said aperture and intended to come into contact with said support face, resilient biasing means interposed between said yoke and said sleeve to urge the sleeve normally towards its second coupling position, a locking bolt cooperating with the yoke and the sleeve to hold the latter in its first assembly position against the resilient bias, and a cam carried by said fork and a cam follower carried by said sleeve and said end or said fork, said cam and cam follower being so oriented that when the sleeve passes from its first position to its second position its protuberance presses against said support face and applies said walls against one another in such a manner that the apices of the Vs tend to come closer to one another.

BRIEF DESCRIPTION OF THE DRAWINGS

FIGS. 3A and 3B are views similar to those in FIGS. 2A and 2B, showing a variant embodiment;

FIGS. 4A and 4B are similar views to those corresponding views shown in FIGS. 2 and 3, showing another variant embodiment of a device according to the invention; and FIGS. 5A and 5B are a longitudinal meridian section and a section in the plane B—B, showing another variant embodiment of the invention.

DETAILED DESCRIPTION OF THE PREFERRED EMBODIMENTS

Figure 1:
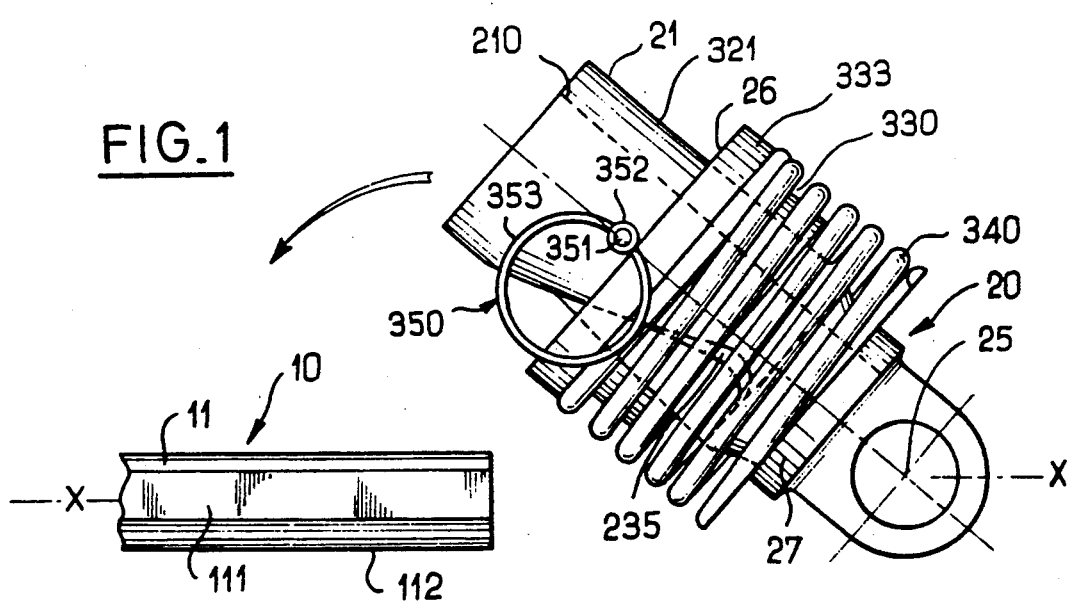
FIG. 1 is an elevation of an embodiment of a device according to the invention in its position of presentation when the sleeve is in its first assembly position.

In the following only what directly or indirectly concerns the invention will be dealt with. For other matters the skilled man in the technique concerned will have recourse to common conventional solutions at his disposal in tackling the particular problems confronting him.

In the following description use will always be made of the same reference numeral to designate homologous elements in any embodiment or variant.

In order to illustrate the invention clearly, it will be assumed that it is described in connection with its application to a motor vehicle steering system, and that on the one hand the yoke in question is fastened to the jaws of a universal joint, and that on the other hand the rod having a noncircular end is fastened to a pinion, for example of a steering gearbox.

For convenience of description the different components of the invention will be described before the functioning of the invention is explained.

The device according to the invention, for this application, is intended to connect a drive shaft to a driven shaft, these shafts here being respectively a rod 10 and a yoke 20. These shafts can turn on a common axis X—X.

The rod 10 is for example connected to a pinion (not shown), while the yoke 20 is in turn fastened to a jaw of a universal joint, of which only the jaw is shown.

As can be seen, the rod 10 has an end 11 of noncircular section. This end 11 has two convergent walls inclined relative to one another in a V whose apex is in a plane passing through the axis X—X. In this embodiment at least one of these walls is, and preferably both walls are two plane flats 111 parallel to the common axis X—X. It will also be observed that these two walls or flats 111 are inclined relative to one another in a V, in such a manner as to bound between them a support face 112 situated opposite the apex of the V. This support face has, for example, a cross-section having the shape of an arc of a circle centered on the common axis, as shown in the drawing, or else a rectilinear cross-section which is oblique in relation to a straight line passing through the path of said axis in the sectional plane.

The yoke 20 is provided with a U-shaped fork 21 which has two branches 22 facing one another and connected together by a bridge 23. These branches and this bridge together bound a longitudinal axial passage 210 open at least one end and leading into the periphery of the yoke, parallel to the axis X—X, by way of an aperture 24. This passage 210 has two convergent walls facing one another and inclined relative to each other in a V whose apex lies opposite said aperture 24. In this embodiment at least one of these walls is, and preferably both of them are, two plane flanks 211 parallel to the axis X—X. These flanks 211 are inclined in a V relative to one another, as can be seen.

This yoke is tiltable about a direction 25 perpendicular to said axis X—X and, approximately, to said branches 22.

In this way it can be seen that said yoke can take up a first presentation position, in which said passage is inclined relative to said common axis and at a distance from the rod end, as illustrated in FIG. 1. From this presentation position the yoke can be pivoted in its direction 25, in the sense indicated by an arrow, so that the passage straddles the end by causing it to penetrate laterally through said aperture, so that the flats and flanks come into contact, as can be seen in FIG. 2.

As is clear from the drawing, the periphery of the yoke 20 carries a guide surface 321, which is preferably cylindrical with a circular cross-section and coaxial to the axis X—X.

Said yoke carries and is locally enclosed by a sheath sleeve or the like 330, which is provided with a bearing surface 331 cooperating with the guide surface 321, to which it is complementary. This sleeve may be closed laterally, as shown in the drawing, or else open.

Figure 2A:
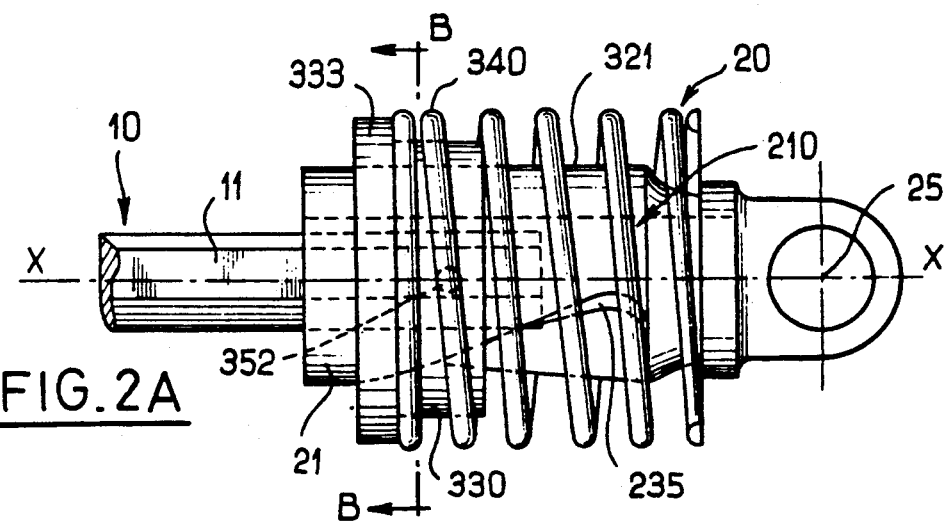
FIGS. 2A and 2B are respectively an elevation and a section in the plane B—B of the device shown in FIG. 1, when the sleeve is in its second coupling position, the shafts being coupled for co-rotation.

The sleeve is mounted on the yoke in such a manner that the sleeve can be relatively displaced between a first assembly position, in which the aperture 24 is free (FIG. 1), and a second coupling position in which said aperture is at least partly masked and closed (FIG. 2A). This sleeve is provided with a protuberance 332 engaged in the aperture 24 and intended to come into contact with the support face 112 of the end, as will be understood in the course of the description. In cross-section this protuberance preferably has a curved profile.

The yoke 20 has a shoulder 27 and the sleeve 330 has a support 333, for example in the form of two arcs of a crown or lugs, projecting outwards on each side, approximately in line with the jaws.

Resilient biasing means 340, for example a coil spring, are interposed between said yoke 20 and said sleeve 330 in order to urge the sleeve normally towards its second coupling position, and bear against said shoulder and said support.

The device is also provided with a locking bolt cooperating with the yoke and the sleeve in order to hold the latter in its first assembly position against the resilient bias. In this embodiment the locking bolt consists of a pin 351 engaged in holes 352 in the yoke 20 and provided with a gripping ring 353. This detachable pin is intended to rest against the end face 26 of the sleeve.

In the embodiment illustrated in FIGS. 1 and 2 the yoke 20 is provided with a peripheral helicoidal ramp 235 disposed on the path travelled by the sleeve when it passes from one of its two positions to the other. The sleeve 330 is in turn provided with a coacting ramp 335 intended to cooperate with the ramp 235 on the yoke, resting on it.

As a result of an arrangement of this kind, it will be understood that when the sleeve is displaced from one of its two positions to the other it will undergo rotation and translation, that is to say will describe an arc of a helix.

A cam 360 is carried by the sleeve 330 and a cam follower 370 by the end 11. In this embodiment this cam 360 is identical with the protuberance 332 and the cam follower 370 with the support face 112.

Figure 2B:
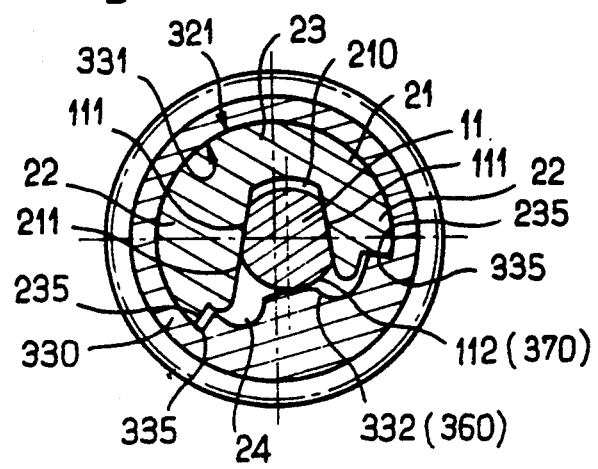

If FIG. 2B is studied attentively, it will be observed that the protuberance/cam 332/360 turns its concavity away from the axis X—X and is preferably eccentric and not situated on the axis X—X. It will therefore be understood that when the sleeve turns, this protuberance/cam tends to move towards or away from the axis X—X, depending on the direction of the displacement. According to the invention the distance between the axis and the protuberance/cam decreases when the sleeve moves from its first to its second position, and the generatrices of the support face/cam follower 112/370 are parallel to the axis X—X.

Functioning is as follows.

Reference will be made to FIG. 1; the coupling device according to the invention is initially in the presentation position, as illustrated. The yoke and the rod are first correctly directed in respect of rotation in such a manner that the apices of the Vs of their respective flats and flanks will be approximately situated on the same side of the axis X—X. The fork is then turned down by pivoting the yoke about the direction 25, in the sense of the arrow, in such a manner as to bring it over the end of the rod.

When this has been done, the ring attached to the pin is gripped and pulled to withdraw the pin and completely detach it from the yoke. Through the action of the coil spring, which was originally tightened as shown in FIG. 1, the sleeve, now being freed, is pushed back oppositely to the direction 25, that is to say towards the end. Through this action the helicoidal ramp and coacting ramp direct the sleeve, which turns at the same time as it slides. The protuberance/cam 332/360 is moved at the same time and therefore comes closer to the axis X—X while approaching the support face/cam follower 112/370 of the end. Through the action applied by the spring, the protuberance/cam exerts a radial centripetal force on the support face, pushes the end back in the passage, and powerfully applies the walls, flats and inclined flanks one against the other, thus wedging them.

It can therefore be seen that an indestructible connection is thus made between the driven shaft and the drive shaft through wedging without clearance, both radially and axially.

The length of the passage is preferably greater than the length of the end, so as to enable fluctuations of manufacturing dimensions or dimensional variations occurring during assembly to be taken into account.

If in the course of operation any play should appear, the force developed by the spring would contribute towards taking it up automatically.

It can also be seen that the end is now held captive in the passage, the opening of which has been at least locally closed by the sleeve.

If the force which the spring can develop is appropriately selected, the coupling is made practically irreversible. However, if for any reason it is desired to be able to disconnect the drive and driven shafts, it is sufficient to repeat the operations in the reverse order. For example, in order to facilitate uncoupling the collar of the sleeve is given a noncircular section, for example a hexagonal section, so that it can if required be gripped by a spanner and turned against the force exerted by the spring, taking into account the coefficients of friction and the slope of the ramps.

If necessary, if the holes in which the pin is held when it secures the sleeve in its first position are judiciously disposed, this pin can be re-inserted, or another rod or cotter inserted, into these holes in such a manner as to lock and hold the sleeve in its second position in order to prevent it from moving back and thus to prevent it from freeing the opening of the passage. It will be observed that play can however still be taken up.

Referring to the views shown in FIGS. 3A and 3B, it can be seen that the embodiment illustrated there differs from the preceding embodiment through the absence of a ramp and a coacting ramp, and through the fact that the support face/cam follower 112/370 has generatrices inclined relative to the axis X—X, in such a manner that its distance increases in the direction corresponding to the passage of the sleeve from its first to its second position. Radial wedging of the flats and flanks and also axial wedging of the protuberance/cam 332/360 against the support face/cam follower 112/370 are thus effected. In this embodiment the sleeve can make only a translatory movement.

The practical application of this embodiment is similar to that of the preceding embodiment, with the exception of the fact that the sleeve is mounted only for sliding parallel to the axis X—X.

Reference will now be made to the embodiment illustrated in the views shown in FIGS. 4A and 4B. In this embodiment the ends 341 of the spring 340 are bent over to make them parallel to the axis X—X. These ends are engaged in eyes 342 formed in the sleeve support and in the shoulder of the yoke. The spring 340 exerts a torque. The protuberance/cam is here once again preferably eccentric relative to the axis X—X. It can therefore be seen that here, as in the embodiment shown in FIGS. 1 and 2, the protuberance/cam, on turning, pushes back the support face/cam follower so as to wedge the flats and the flanks. If desired, the support surface is likewise inclined as in the embodiment illustrated in FIGS. 3A and 3B, in such a manner as to achieve axial wedging in addition.

In the embodiments of the invention which are described and illustrated, the yoke and the sleeve are capable of relative movement with helical translatory or rotational displacements. It is clear that it is also possible to associate rotation and translation in any order by utilizing a right-angled groove or slot or the like with one arm parallel to the axis, a stud or the like being engaged in this groove. If the rotation precedes the translation the arm at right angles to the axis serves as locking bolt.

The locking bolt is similarly a detachable pin. In practice this pin may be rupturable and break, when pivoting occurs, through the impact of this pin against the end.

The support face/cam follower may have in cross-section a correctly oriented oblique rectilinear profile.

As will have been understood, what is important in accordance with the invention is that the generatrix of movable contact between the cam and the cam follower is inclined relative to the axis in such a manner that, when the sleeve is displaced from its first to its second position, a centripetal radial force is created to urge the apices of the Vs of the corresponding convergent walls of the end and of the fork passage towards one another. The functions and the structures assigned to said cam and said cam follower may be exchanged. Thus for example, on the one hand, the cam follower 370 may be disposed on the summit edge of the fork after the style of inclined planes whose distance from the axis X—X increases in proportion to movement away from the direction 25, and on the other hand the cam 360 may be disposed on the sleeve opposite the protuberance and facing the latter after the style of planes inclined in the same direction (see FIG. 5).

The angles of the complementary Vs of the flats and flanks and angles of contact between the cam and cam follower take into account the coefficients of friction of the surfaces and of the spring in order to obtain, when desired, an irreversible connection.

When the sleeve is open it may be in the form of a plate whose edges parallel to the axis X—X are bent over to form C-shaped hooks facing one another and placed on the protuberance side. These edges then cooperate with flanges which are provided on the free edges of the branches of the fork and oriented parallel to the axis X—X and which are turned back-to-back; the sleeve then slides on the yoke after the style of a drawer, guided by said hooks and said flanges which engage one in the other.

The fork is for example made of thick sheet metal, folded and rolled, and the sleeve of pressed thick sheet metal.

From the foregoing all the advantages of the device according to the invention will be immediately realized, since it makes it possible very easily, and in places where space is limited and access difficult, to couple together drive and driven shafts, without either radial or axial play, and by means of an extremely simple manipulation which consists in pivoting the yoke, with or without the shaft carrying it, and in acting on a locking bolt which held the device cocked in its position of presentation, in order to free it so that it will pass to its coupling position.

All this is done without the aid of either tools or auxiliary equipment.

I claim:

1. A device for coupling a first shaft and a second shaft which are rotatable about a common axis, said device comprising;
    a rod connected coaxially with said first shaft and having an end portion of non-circular cross section with two convergent faces extending parallel to said common axis and inclined relative to each other in a V of which the apex is in a plane passing through said common axis and with a support face opposite said apex,
    a yoke having a first end portion of a U-shaped cross section with two branches which are connected by a bridge and which together bound a longitudinal axial passage which is open to the periphery of said yoke through a longitudinal aperture which is open at one end, said axial passage having two convergent walls which face one another and are inclined relative to one another in a V of which the apex is situated opposite to said aperture, said yoke also having a guide surface on its periphery,
    means at a second end of said yoke for pivotally mounting said yoke on said second shaft for pivotal movement about an axis perpendicular to said common axis between a coupling position in which said non-circular end portion of said rod is received in said axial passage of said yoke and an open position in which said yoke is clear of said rod,
    a sleeve slidable on said guide surface of said yoke between an assembly position in which said aperture of said yoke is free to receive said rod and a coupling position in which said aperture is at least partially closed by said sleeve and said sleeve engages said support face of said rod to press said convergent faces of said end portion of said rod against said convergent walls of said axial passage of said yoke,
    means for resiliently biasing said sleeve for movement from said assembly position to said coupling position, and
    means for releasably holding said sleeve in said assembly position.

2. A device according to claim 1, in which said means for releasably holding said sleeve in said assembly position comprising a locking bolt receivable in a hole in said yoke to hold said sleeve in said assembly position against the action of said biasing means.

3. A device according to claim 1, in which said sleeve has a cam surface which is engageable with said support face of said end portion of said rod.

4. Device according to claim 1, in which said yoke has a peripheral helicoidal ramp disposed in the path of travel of said sleeve from one position to another and said sleeve has a coacting ramp cooperating with said ramp of said yoke so that when said sleeve moves from one position to another, it will move in a helical path.

5. Device according to claim 1, in which said convergent faces of said end portion of said rod and said convergent walls of said axial passage of said yoke are plane.

6. Device according to claim 1, in which said support face of said end portion of said rod is convex.

7. Device according to claim 1, in which said guide surface of said yoke is cylindrical and coaxial with said common axis.

8. Device according to claim 7, in which said biasing means comprises a coil spring opposite ends of which engage shoulders on said yoke and said sleeve respectively.

9. Device according to claim 8, in which ends of said spring are bent so as to be parallel with the axis of said guide surface of said yoke and are received in holes in said shoulders respectively.

10. Device according to claim 1, in which said longitudinal axial passage of said yoke has a length greater than the length of said end portion of said rod.

* * * * *